(12) United States Patent  
Puccini

(10) Patent No.: US 8,143,519 B2
(45) Date of Patent: Mar. 27, 2012

(54) INTEGRAL WIND TURBINE WIRING ENCLOSURE CABINET

(75) Inventor: Kevin F. Puccini, Cincinnati, OH (US)

(73) Assignee: Connector Manufacturing Company, Hamilton, OH (US)

( * ) Notice: Subject to any disclaimer, the term of this patent is extended or adjusted under 35 U.S.C. 154(b) by 535 days.

(21) Appl. No.: 12/321,846

(22) Filed: Jan. 27, 2009

(65) Prior Publication Data

US 2010/0186984 A1 Jul. 29, 2010

(51) Int. Cl.
*H02G 3/18* (2006.01)
*H05K 5/02* (2006.01)

(52) U.S. Cl. ......... 174/59; 174/50; 174/520; 312/223.1; 312/223.6; 361/600; 361/601; 361/724

(58) Field of Classification Search .................. 174/480, 174/481, 50, 53, 57, 17 R, 59, 520, 500, 489, 174/68.1, 68.3, 135, 72 A; 248/906; 312/223.1, 312/223.2, 223.6, 223.3; 439/535, 949; 361/600, 361/601, 724, 730, 752, 796, 797, 826
See application file for complete search history.

(56) References Cited

U.S. PATENT DOCUMENTS

| | | | | | |
|---|---|---|---|---|---|
| 4,079,439 | A | * | 3/1978 | Coles et al. ................... | 361/637 |
| 4,517,623 | A | * | 5/1985 | Barner et al. ............... | 312/223.6 |
| 5,071,143 | A | * | 12/1991 | Byerly et al. ............. | 174/153 G |
| 5,568,362 | A | * | 10/1996 | Hansson ......................... | 174/50 |
| 5,573,321 | A | * | 11/1996 | Bell, Jr. ....................... | 312/223.1 |
| 5,745,337 | A | * | 4/1998 | Reiner ........................... | 361/826 |
| 7,737,360 | B2 | * | 6/2010 | Wiemeyer et al. ............. | 174/50 |
| 7,825,333 | B2 | * | 11/2010 | Puccini .......................... | 174/50 |

* cited by examiner

*Primary Examiner* — Angel R Estrada
(74) *Attorney, Agent, or Firm* — Holland & Knight LLP; John P. Moran, Esq.

(57) ABSTRACT

A wind turbine wiring enclosure cabinet is provided having a housing and an electrical circuit connection means. The housing has a top surface, a bottom surface, and a sidewall in contact with the top surface, the top surface having a plurality of apertures formed therein. The housing has an interior, and the sidewall has at least one door accessing the interior. The electrical circuit connection means includes a plurality of non-conductive vertical members, and a plurality of conductive elements having connected thereto a plurality of connector retention means. Each connector retention means has a slot formed therein for insertion therein of a lay-in lug assembly. Each non-conductive vertical member has two sidewalls with an intermediate wall connected to each of the two sidewalls. The apertures formed in the top surface are arranged in a plurality of groups, as are the apertures formed in the bottom surface.

10 Claims, 4 Drawing Sheets

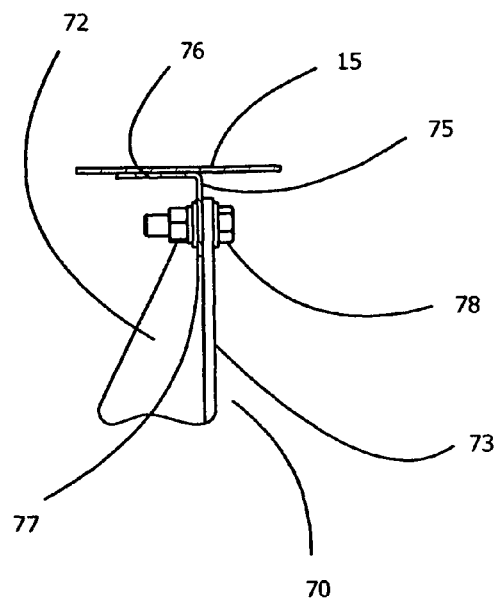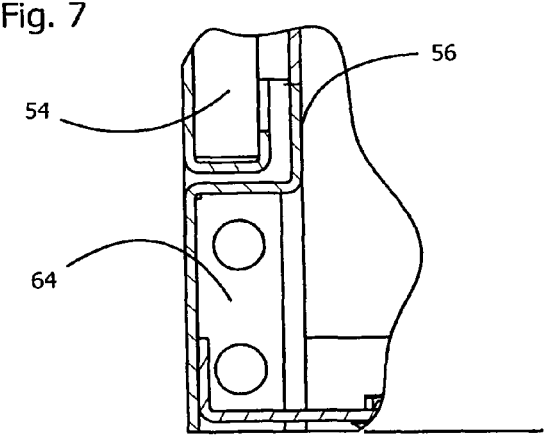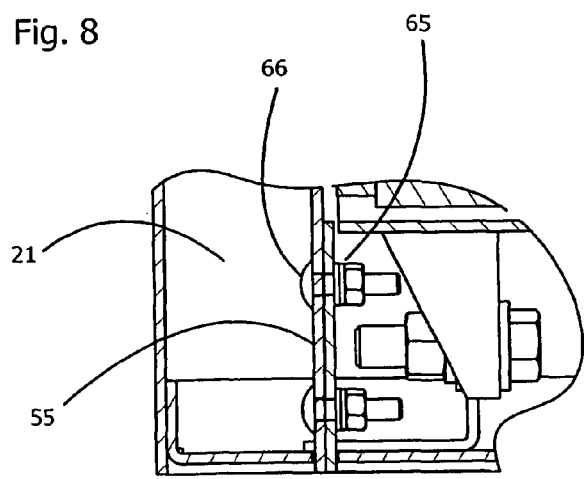

INTEGRAL WIND TURBINE WIRING ENCLOSURE CABINET

BACKGROUND OF THE INVENTION

1. Field of the Invention

This invention relates generally to wind turbines, and more particularly, to a cabinet that can be incorporated integrally into the interior of the vertical tower of a wind turbine at the time of its construction, in conjunction with the installation of the wiring assembly of the wind turbine.

2. Description of the Related Art

This invention is directed to the providing of an electrical cabinet to enclose the joined cables associated with wind turbines. Wind turbines are sometimes referred to as windmills, but the power generated by them is many times that of the windmills seen on rural farms in the twentieth century. Modern wind turbines can be over 200 feet high and provide over 2.5 megawatts of electricity. The newer, taller type of wind turbines are being touted as one way to reduce dependence on oil, while at the same time reducing air pollution.

One problem associated with wind turbines is caused by their height. While taller turbines can produce more electricity due to the air currents several hundred feet above ground, the energy that is harnessed by the blades must be transmitted downwardly through the interior of the structure by way of wire cables. Due to the size and weight of these cables, each cable pathway is created by attaching a plurality of cables to one another in series. Furthermore, there are typically several (i.e. 3-5) cables secured to one another, so for example, if 18 cables descend from the top to the bottom of a wind turbine tower, they are typically bundled in three groups of 5 cables and one group of 3 cables.

The prior art of wind turbines typically has had each individual cable attached to the next adjacent cable above or below it by means of a copper compression splice, with one end of the compression splice in direct contact with the cable descending from above the splice and with the other end of the compression splice in direct contact with the cable that descends below the copper compression splice. The area of the splice in then typically wrapped with a plastic sheet-form member to theoretically provide some degree of insulation.

This means of attachment results in a significant amount of heat being generated at the site of the splice, which in turn is detrimental to the electrical circuit. Due to the type of splice used to connect the adjacent wire cables in the prior art, the circuits had a tendency to break down, which associated with unintentionally redistributing the electrical power into the remaining cables, caused the other downwardly extending cables within the tower to undergo greater stress than was originally intended. Consequently, this stress could cause other of the remaining cables to degrade.

Additionally, in the prior art of wind turbines, as the cables were joined inside the tower as construction on the tower progressed, the cables were secured directly to the interior of the turbine wall. Consequently, individuals subsequently performing maintenance inside the turbine tower had to be extremely careful about not coming into contact with the splice sites, lest electrocution possibly occur. Despite the high levels of electricity carried through each set of vertically depending cables, the safety situation is obviously questionable, yet a solution to this long-felt need has heretofore not been found.

It is thus apparent that the need exists for a better way to join the wire cables used in wind turbines integral with the initial construction of the wind turbine tower, and for a way to keep persons inside the tower of the wind turbine safer as it relates to the current flowing through the wire cables. Furthermore, the solution to this existing problem should be relatively easy and cost effective to fabricate and install as part of the initial construction phase.

SUMMARY OF THE INVENTION

In accordance with the present invention, there is disclosed a wind turbine wiring enclosure cabinet having a housing and an electrical circuit connection means wind turbine wiring enclosure cabinet is provided having a housing and an electrical circuit connection means. The housing has a top surface, a bottom surface, and a sidewall in contact with the top surface, the top surface having a plurality of apertures formed therein. The housing has an interior, and the sidewall has at least one door accessing the interior. The electrical circuit connection means includes a plurality of non-conductive vertical members, and a plurality of conductive elements having connected thereto a plurality of connector retention means. Each connector retention means has a slot formed therein for insertion therein of a lay-in lug assembly. Each non-conductive vertical member has two sidewalls with an intermediate wall connected to each of the two sidewalls. The apertures formed in the top surface are arranged in a plurality of groups, as are the apertures formed in the bottom surface. Each aperture in the top surface has associated therewith and in contacting relationship thereto a plastic grommet. Each aperture in the bottom member also preferably has associated therewith in contacting relationship therewith a plastic grommet.

There is also disclosed a wind turbine wiring enclosure cabinet having a housing and an electrical circuit connection means. The housing has a top surface, a sidewall in contact with the top surface, with the top surface having a plurality of apertures formed therein. The housing has an interior, with the sidewall having at least one door accessing the interior. The electrical circuit connection means includes a plurality of non-conductive vertical members, and a plurality of conductive elements having connected thereto a plurality of connector retention means. Each non-conductive vertical member is attached to the housing. The housing also includes a bottom member, with the bottom member being attached to the housing and with the bottom member being located below the electrical circuit connection means. Apertures formed in the top surface are arranged in a plurality of groups and the bottom member also has a plurality of apertures formed therein, with the apertures formed in the bottom member also being arranged in a plurality of groups. Each non-conductive vertical member has a top and a bottom end portion, with each of the end portions being attached to the housing.

The primary objective of this invention is to provide a better way to join the wire cables used in wind turbines so that the degradation of the electrical circuits inside the tower of the wind turbine is significantly lessened.

Another objective of this invention is to provide such a device that keeps persons inside the tower of the wind turbine safer when they are around the wire cables, given the current flowing therethrough.

Still another objective is to provide such a device that is relatively easy to install as part of a wind turbine tower when initially erected.

Other objects and advantages of the invention will be apparent from the following description, the accompanying drawings and the appended claims.

BRIEF DESCRIPTION OF THE DRAWINGS

FIG. 6 is an enlarged view taken along line 6-6 of FIG. 5.

FIG. 7 is an enlarged view partly exposed taken along line 7-7 of FIG. 3.

FIG. 8 is a partly exposed enlarged view taken along line 8-8 of FIG. 1.

Figure 1:
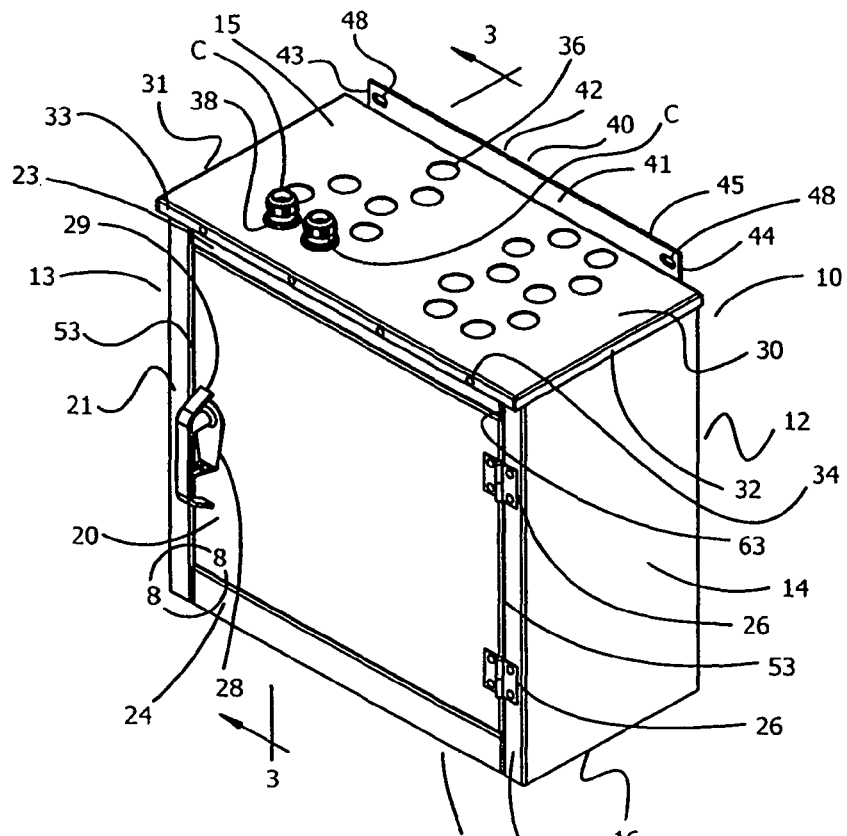
FIG. 1 is a perspective view of an integral wind turbine wiring enclosure cabinet made in accordance with this invention.
Figure 9:
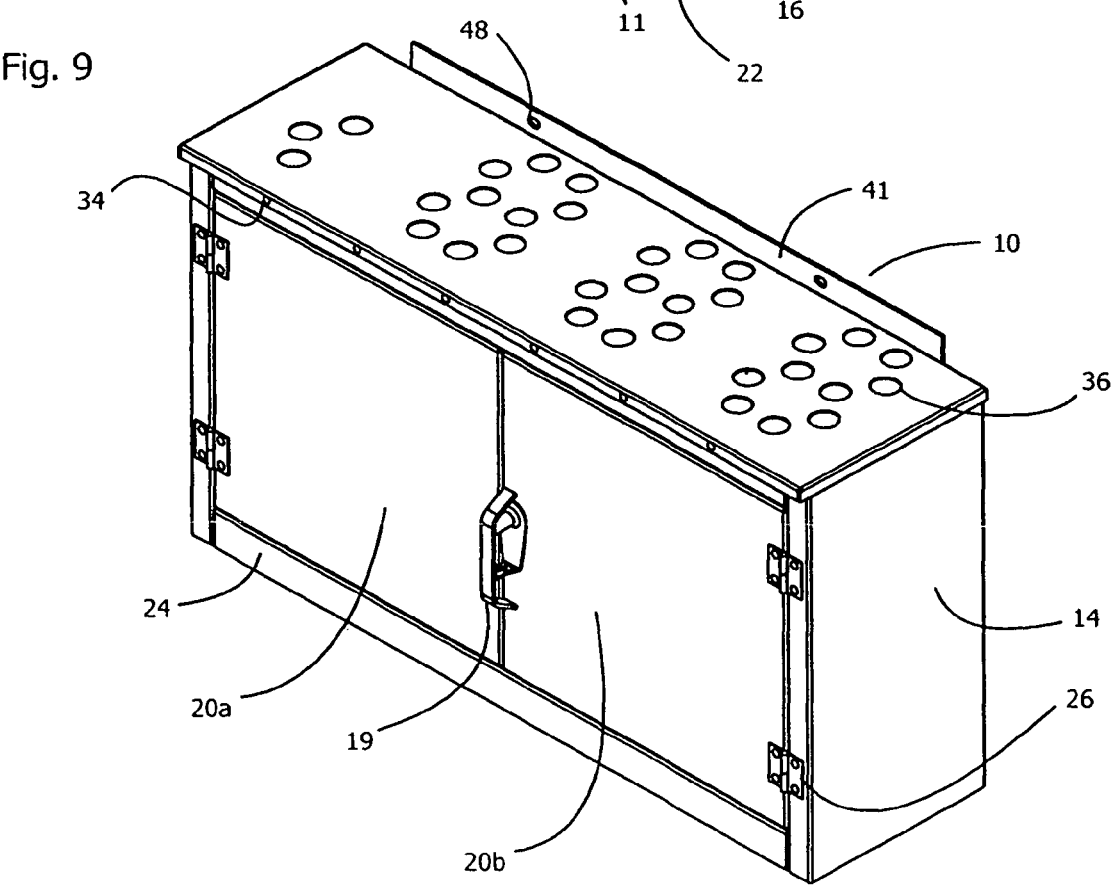
FIG. 9 is a modified embodiment of the invention.
Figure 2:
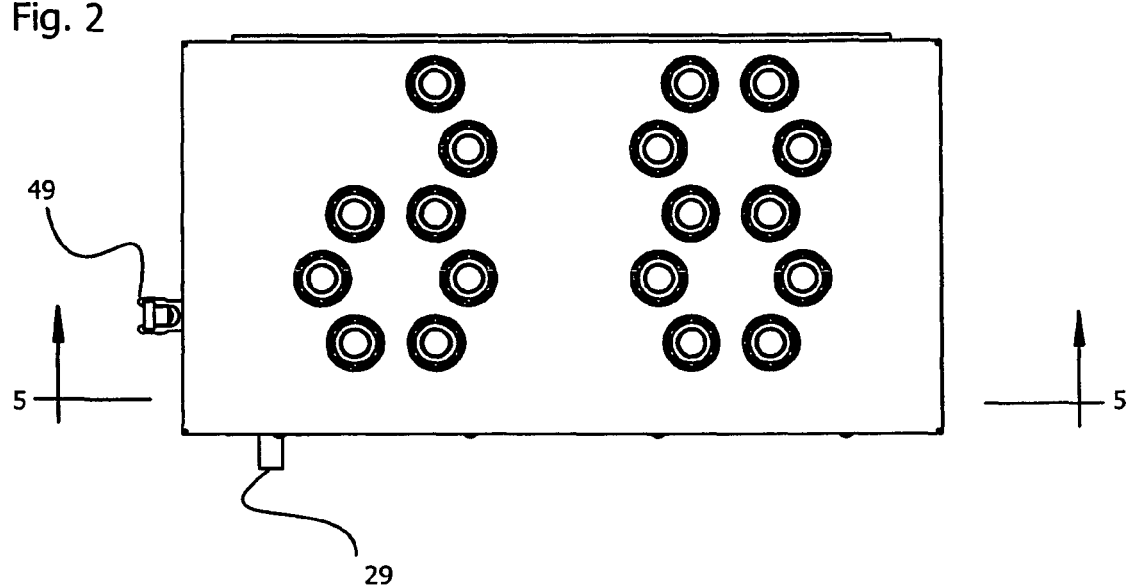
FIG. 2 is a top plan view of the invention similar to that shown in FIG. 1, but showing the top in its operative condition.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

This invention addresses the above limitations associated with prior art wind turbines resulting in an integral wind turbine wiring enclosure cabinet that can especially be utilized in wind turbines as they are erected. Having reference to the drawings, attention is directed first to FIG. 1, which discloses an integral wind turbine wiring enclosure cabinet made in accordance with this invention and designated generally by the numeral 10. The integral wind turbine wiring enclosure cabinet 10 can be appreciated as having a housing 10a and electrical circuit connection means 10b with front wall 11, rear wall 12, sidewalls 13 and 14, serving as the external walls of the cabinet. The housing 10a has a top 15 that typically is of a rectangular shape. The top is generally planar, and extending downwardly from the upper surface of the top are top surface side flanges 31 and 32, and front flange 33 with top surface attachment apertures 34, so that the top 15 resembles a lid that rests atop the sidewalls of the cabinet. Fastening means are inserted into the top surface attachment apertures and are secured to the upper door frame portion. The top surface side flanges and front flange each have a flange inner wall that rests directly adjacent the housing sidewalls and front. The sidewall in the preferred embodiment of the invention has four sides, but the shape is not critical. Attached to one sidewall is a lay-in lug assembly 49 for the ground wire.

The top surface also has top surface apertures 36 through which plastic grommets 38 pass. These plastic grommets, known in the art as PGs, typically have at least six sides and can often have an aperture size of 1" or more aligned with the top apertures. A cable C passes through each of the insulated grommets and is secured to the electrical circuit connection means 10b in the interior of the housing 10a as shown.

The bottom member 16 that forms the bottom wall of the cabinet has an upper surface, a lower surface, with the bottom being secured to the sidewall of the cabinet. The bottom member 16 has a plurality of apertures formed therein that correspond to the apertures in the top of the cabinet, with PGs being secured at each such aperture as can be seen in a comparison of FIGS. 3 and 5.

As can be appreciated from FIG. 1, the front wall 11 features a door 20, a first upright panel 21, a second upright panel 22, and upper door frame portion 23, a lower door frame portion 24, and a door fastening member 26 shown as a hinge. The door has a handle 28 with handle cover, both of the type used on electrical cabinets.

A cabinet attachment portion 40 at the rear of the housing secures the cabinet to the wind turbine. Preferably there are two cabinet attachment portions, one at the top of the cabinet and the other at the bottom as shown best in FIG. 3. The cabinet attachment portion has a front wall 41, a rear wall 42, ends 43, 44, a top 45, a bottom 46, and cabinet attachment apertures 48 through which fasteners pass to secure the cabinet to the wind turbine.

As can be appreciated from a comparison of FIGS. 1, 3, 7, and 8, there is an inner edge 53 of each of the first and second upright panels 21 and 22. Each inner edge has an inwardly extending flange 54 that extends towards the interior of the cabinet. The inwardly extending flange 54 has apertures 55 to facilitate the attachment of the upper and lower door frame portions to the first and second upright panels. At the opposite end of each inwardly extending flange from where it adjoins the upright panels 21 and 22, there is a vertical doorstop portion which extends a short distance perpendicularly towards the door opening, such that when the door is shut, the door is in a parallel plane to the vertical doorstop portion. Similarly, there is an outer edge 63 of the upper door frame portion 23 and an inwardly extending side flange 64 with apertures 65 for fastening means 66.

Figure 4:
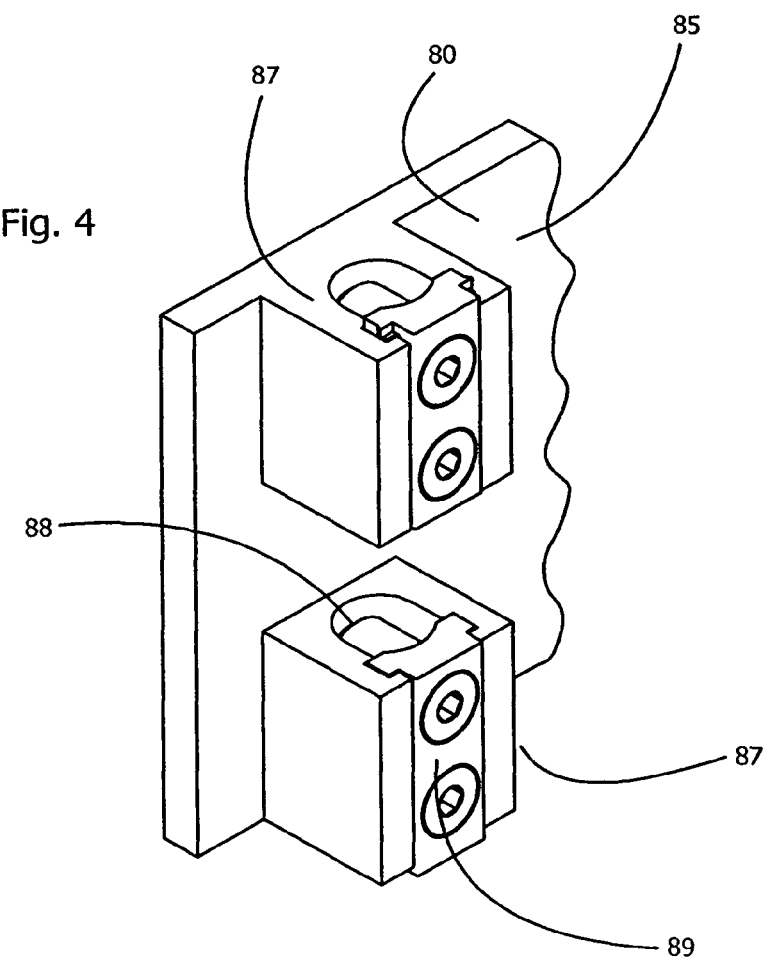
FIG. 4 is a perspective view on a greatly enlarged scale of a portion of the insulated crossbeam.
Figure 3:
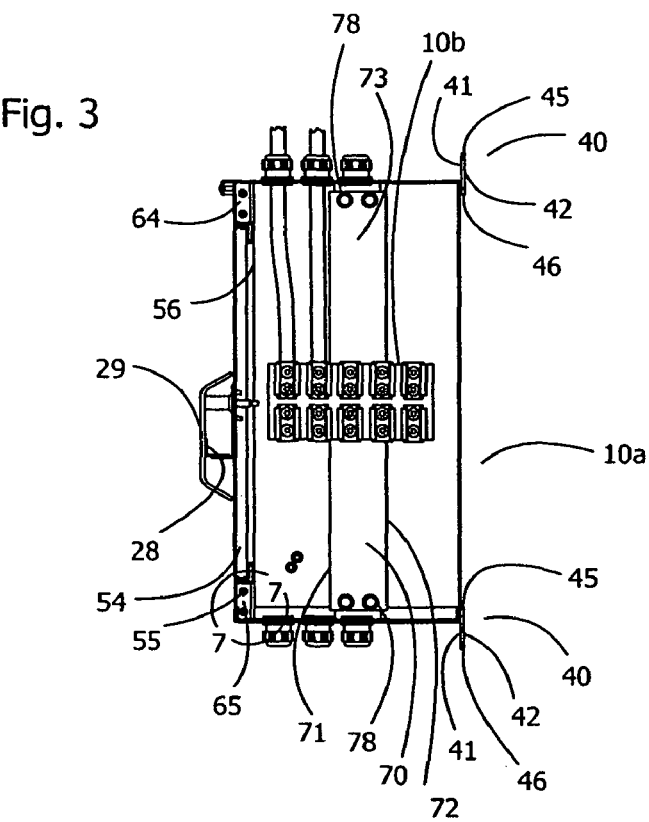
FIG. 3 is a vertical sectional view of the invention taken along line 3-3 of FIG. 1.
Figure 5:
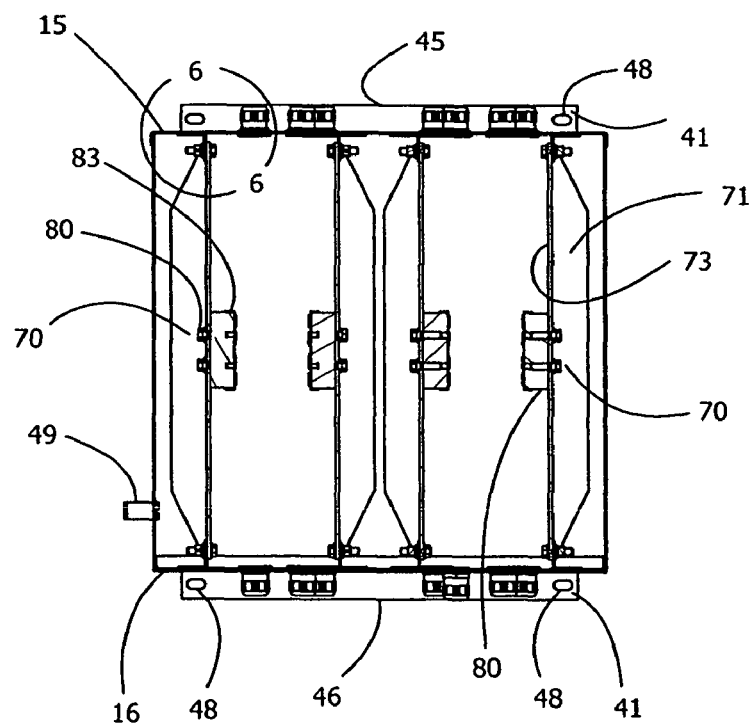
FIG. 5 is a vertical sectional view taken along line 5-5 of FIG. 2.

As can best be appreciated from a comparison of FIGS. 3, 4, and 5, the electrical circuit connection means 10b is located in the interior of the cabinet. The electrical circuit connection means 10b has at least one and preferably a plurality of insulated vertical members 70. Although the insulated vertical member could be completely planar, it is shown as being shaped more like a C-channel, with a pair of sidewalls 71 and 72, and an intermediate wall 73 which extends between the two sidewalls 71 and 72 respectively, with the vertical member being secured to the top 15 and bottom 16 of the cabinet as can best be appreciated from a comparison of FIGS. 3, 5 and 8.

Each insulated vertical member is secured by appropriate means, however, the embodiment shown in the drawings utilizes a connector 75 that has one end 76 welded to the top 15 or bottom 16, and the other end 77 attached preferably directly adjacent to the rear side of the insulated vertical member 70. The connector uses at least one fastener 78, each such fastener passing through an aperture in the intermediate wall 73 and an aperture in the fastener 75, with two fasteners at the top and bottom of the insulated vertical member being shown. The insulated vertical member is preferably fabricated from Glastic®, a product of Glastic Corp. for electrical insulating boards for use in connection with electrical control panels, transformer spacer sticks and support insulation of various types and sizes.

Secured to each insulated vertical member 70 is a conductive plate 80, with each of these plates 80 being secured to the insulated vertical member 70 by fastening means 83, shown as being four bolts which pass through apertures in the plate 80 and insulted vertical member 70. The conductive plates preferably are fabricated from copper and are of the type of conductive plates well known in the electrical cabinet art.

Each conductive plate 80 has a first portion 85 shown as being a planar rectangular plate that is secured to the vertical member 7Q, and a plurality of conductive plate connector retention means 87, shown as a generally cubical member with a slot 88 that accommodates a lay-in lug connector 89 of the type well known in the electrical art. The first and second portions can be fabricated separately and then secured to each other. Each conductive plate is typically of a rectangular shape has a conductive plate top and a conductive plate bottom. Additionally, each conductive plate has conductive plate front surface where the connector retention means is located and a rear surface that abuts the insulated vertical member. Each connector 89 permits a cable of the wind turbine to be secured therein, thereby creating a circuit that includes the conductive plates along with the cables above and below each cabinet.

In actual use, the sidewalls of the cabinet are secured to the interior wall of the tower preferably by attachment to a bracket that is secured directly to the wall of the tower. Cables C are passed through the top and bottom of the cabinet and secured to the appropriate compression lug associated with the appropriate conductive plate. As shown in the drawing figures, a plurality of sets of five cables C pass through the cabinet, with one set of three cables C being provided for the neutral ground. The door of the cabinet is then closed, resulting in the electrical circuit connections being impossible for a worker to inadvertently come into contact with while inside the tower.

A key aspect of this invention is that the cabinet provides a better way to join the wire cables used in wind turbines, so that the degradation of the electrical circuits inside the tower of the wind turbine is significantly lessened. The presence of the conductive plates allows heat to be dissipated as well as providing for offsetting any bad connection that may exist within any cabinet by allowing the equalizing of current downline.

Another key aspect of this invention is that the cabinet keeps persons inside the tower of the wind turbine safer when they are around the wire cables, given the current flowing through the cables.

While the form of apparatus herein described constitutes a preferred embodiment of the present invention, it is to be understood that the invention is not limited to this precise form of apparatus and that changes may be made therein without departing from the scope of the invention which is defined in the appended claims.

What is claimed is:

1. A wind turbine wiring enclosure cabinet comprising
   a housing having a top surface, a sidewall in contact with said top surface, said top surface having a plurality of apertures formed therein, said housing having an interior, said sidewall having at least one door accessing said interior, and
   an electrical circuit connection means, said connection means including a plurality of non-conductive vertical members, a plurality of conductive elements having connected thereto a plurality of connector retention means, said non-conductive vertical member being attached to said housing.

2. The wind turbine wiring enclosure cabinet according to claim 1 wherein said housing includes a bottom surface, said bottom surface having a plurality of apertures formed therein and being attached to said housing, said bottom member being located below said electrical circuit connection means.

3. The wind turbine wiring enclosure cabinet according to claim 1 wherein said apertures formed in said top surface are arranged in a plurality of groups.

4. The wind turbine wiring enclosure cabinet according to claim 2 wherein said apertures formed in said bottom member are arranged in a plurality of groups.

5. The wind turbine wiring enclosure cabinet according to claim 1 wherein each aperture in said top surface has associated therewith and in contacting relationship thereto a plastic grommet.

6. The wind turbine wiring enclosure cabinet according to claim 2 wherein each aperture in said bottom member has associated therewith and in contacting relationship thereto a plastic grommet.

7. The wind turbine wiring enclosure cabinet according to claim 1 wherein each said non-conductive vertical member has two sidewalls with an intermediate wall connected to each of said two sidewalls.

8. A wind turbine wiring enclosure cabinet comprising
   a housing having a top surface, a sidewall in contact with said top surface, said top surface having a plurality of apertures formed therein, said housing having an interior, said sidewall having a door accessing said interior, and
   an electrical circuit connection means, said electrical circuit connection means including a plurality of non-conductive vertical members, a plurality of conductive elements having connected thereto a plurality of connector retention means, said non-conductive vertical member being attached to said housing, said housing including a bottom member, said bottom member attached to said housing sidewall, said bottom member being located below said electrical circuit connection means, said apertures formed in said top surface are arranged in a plurality of groups and said bottom member having a plurality of apertures formed therein, said apertures formed in said bottom member are arranged in a plurality of groups.

9. The wind turbine wiring enclosure cabinet according to claim 8 wherein each said non-conductive vertical member has a top and a bottom end portion, each of said end portions being attached to said housing.

10. A wind turbine wiring enclosure cabinet comprising:
    a housing including a back, a top operatively coupled to the back, opposing sides operatively coupled to the top and to the back, and a bottom operatively coupled to the opposing sides and to the back, wherein the top has at least one opening therein configured to allow a first cable to pass there through, and the bottom has at least one opening therein configured to allow a second cable to pass there through;
    a plurality of non-conductive members fixedly coupled within the housing;
    a plurality of conductive elements fixedly coupled to corresponding ones of the non-conductive members, each of the conductive elements includes a plurality of electrical connectors, wherein each electrical connector includes
    a top opening facing the top of the housing and configured to receive and a mechanically hold the first cable therein, and
    a bottom opening facing the bottom of the housing and configured to receive and mechanically hold the second cable therein.

* * * * *